(12) United States Patent
Chen et al.

(10) Patent No.: US 10,612,621 B2
(45) Date of Patent: Apr. 7, 2020

(54) DAMPING DEVICE FOR WINDOW COVERING

(71) Applicant: NIEN MADE ENTERPRISE CO., LTD., Taichung (TW)

(72) Inventors: Lin Chen, Taichung (TW); Keng-Hao Nien, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 269 days.

(21) Appl. No.: 15/159,309

(22) Filed: May 19, 2016

(65) Prior Publication Data

US 2017/0211657 A1 Jul. 27, 2017

(30) Foreign Application Priority Data

Jan. 22, 2016 (CN) ..................... 2016 2 0065142 U

(51) Int. Cl.
| | |
|---|---|
| *E06B 9/80* | (2006.01) |
| *F16F 15/18* | (2006.01) |
| *E06B 9/322* | (2006.01) |
| *B65H 75/48* | (2006.01) |
| *E06B 9/307* | (2006.01) |

(Continued)

(52) U.S. Cl.
CPC .......... *F16F 15/18* (2013.01); *B65H 75/486* (2013.01); *E06B 9/307* (2013.01); *E06B 9/322* (2013.01); *E06B 9/324* (2013.01); *E06B 9/80* (2013.01); *F16F 9/125* (2013.01); *E06B 9/388* (2013.01); *E06B 2009/3222* (2013.01); *E06B 2009/807* (2013.01); *F16F 2222/04* (2013.01); *F16F 2222/06* (2013.01); *F16F 2222/12* (2013.01);

(Continued)

(58) Field of Classification Search
CPC ...... E06B 9/78; E06B 9/56; E06B 2009/2625; E06B 2009/2622; E06B 2009/6854; E06B 2009/785; E06B 2009/807; E06B 9/80
USPC ....... 160/168.1 P, 84.02, 170, 171, 319, 321, 160/322, 296, 310
See application file for complete search history.

(56) References Cited

U.S. PATENT DOCUMENTS

| | | | | |
|---|---|---|---|---|
| 4,681,279 | A * | 7/1987 | Nakamura | E06B 9/68 160/294 |
| 4,684,911 | A * | 8/1987 | Streeter | E06B 9/32 160/176.1 P |

(Continued)

FOREIGN PATENT DOCUMENTS

JP          05214882 A  *  8/1993  ............ E06B 9/264

*Primary Examiner* — Daniel P Cahn
(74) *Attorney, Agent, or Firm* — Tracy Heims; Apex Juris, pllc.

(57) ABSTRACT

A damping device for a window covering includes a headrail, a covering material, and a driving device. The driving device is located in the headrail to raise and extend the covering material. The damping device is provided in the headrail, and includes a metal member and a magnetic member, wherein at least a magnetic pole of the magnetic member faces the metal member. The metal member is located within a magnetic field of the magnetic member. Either one or both of the metal member and the magnetic member can be driven by the driving device to cause relative movement therebetween. The damping device is able to provide a desired damping effect regardless of changes in temperature or even after prolonged use. The damping device provides a damping effect which slows down the rotation of the metal member and the movement of the covering material.

7 Claims, 10 Drawing Sheets

(51) Int. Cl.
*E06B 9/324* (2006.01)
*F16F 9/12* (2006.01)
*E06B 9/388* (2006.01)

(52) U.S. Cl.
CPC ... *F16F 2224/025* (2013.01); *F16F 2224/045* (2013.01)

(56) References Cited

U.S. PATENT DOCUMENTS

| | | | | |
|---|---|---|---|---|
| 4,754,182 A * | 6/1988 | Streeter | ............ | E06B 9/36 160/104 |
| 4,797,591 A * | 1/1989 | Streeter | ............ | E06B 9/36 160/104 |
| 5,467,266 A * | 11/1995 | Jacobs | ............ | B60J 1/2016 160/1 |
| 6,168,107 B1 * | 1/2001 | Bishop | ............ | B65H 75/4442 242/381 |
| 6,283,192 B1 * | 9/2001 | Toti | ............ | E06B 9/30 160/170 |
| 6,378,148 B1 * | 4/2002 | Votel | ............ | A61G 7/1015 5/81.1 HS |
| 6,496,991 B1 * | 12/2002 | Votel | ............ | A61G 7/1026 5/81.1 HS |
| 6,715,528 B2 * | 4/2004 | Rossini | ............ | E06B 9/264 160/107 |
| 6,924,615 B2 * | 8/2005 | Cavarec | ............ | E06B 9/32 310/152 |
| 8,540,005 B2 * | 9/2013 | Baugh | ............ | E06B 9/262 160/168.1 P |
| 9,410,364 B1 * | 8/2016 | Zheng | ............ | E06B 9/264 |
| 2003/0051829 A1 * | 3/2003 | Sears | ............ | E06B 9/13 160/243 |
| 2004/0090201 A1 * | 5/2004 | Cavarec | ............ | E06B 9/32 318/466 |
| 2006/0006751 A1 * | 1/2006 | Cavarec | ............ | E06B 9/80 310/77 |
| 2007/0000741 A1 * | 1/2007 | Pribonic | ............ | H02K 49/046 188/267 |
| 2007/0125504 A1 * | 6/2007 | Early | ............ | E06B 9/264 160/107 |
| 2008/0000054 A1 * | 1/2008 | Huang | ............ | E06B 9/326 24/115 F |
| 2008/0105503 A1 * | 5/2008 | Pribonic | ............ | H02K 49/046 188/267 |
| 2010/0013424 A1 * | 1/2010 | Nicholson | ............ | E06B 9/62 318/466 |
| 2011/0017408 A1 * | 1/2011 | Maksan | ............ | E06B 9/264 160/168.1 R |
| 2013/0062024 A1 * | 3/2013 | Huang | ............ | E06B 9/50 160/127 |
| 2013/0105094 A1 * | 5/2013 | Colson | ............ | E06B 9/266 160/133 |
| 2014/0224437 A1 * | 8/2014 | Colson | ............ | E06B 9/78 160/291 |
| 2016/0222727 A1 * | 8/2016 | Schiraldi | ............ | E06B 9/80 |
| 2016/0245018 A1 * | 8/2016 | Pohjonen | ............ | E06B 9/80 |
| 2017/0211321 A1 * | 7/2017 | Chen | ............ | E06B 9/322 |
| 2017/0226799 A1 * | 8/2017 | Hebeisen | ............ | E06B 9/80 |

* cited by examiner

DAMPING DEVICE FOR WINDOW COVERING

BACKGROUND OF THE INVENTION

1. Technical Field

The present invention relates generally to a reeling mechanism of a window covering, and more particularly to a damping device which is capable of slowing down the speed of raising and extending the window covering.

2. Description of Related Art

A conventional window covering includes a headrail, a covering material, and a rotary shaft, wherein the rotary shaft is provided in the headrail to raise and extend the covering material. During the process of extending the covering material, the weight of the covering material would generate a downward pulling force, which accelerates the rolling of the rotary shaft, and makes the covering material extend with an excessive speed. As a result, some components may be worn, or the covering material may bump into objects below. Similarly, during the process of raising the covering material, an excessive rolling speed of the rotary shaft would make the covering material raise too fast as well.

In light of this, a traditional window covering usually includes an oil damping device installed on a rotary shaft thereof to slow down the rotating speed of the rotary shaft and, consequently, the speed of raising or extending the covering material. However, the viscosity of the oil in the oil damping device is sensitive to temperature. When the temperature is high, the viscosity of the oil is low, which reduces the damping effect; in contrast, when the temperature is low, the viscosity of the oil is high, which affects the smoothness of operating the window covering. Also, after being used for a long period, the oil may leak from the oil damping device, which worsens the damping effect, and even makes the oil damping device completely unable to provide the damping effect.

BRIEF SUMMARY OF THE INVENTION

In view of the above, the primary objective of the present invention is to provide a damping device of a window covering, which provides a desired damping effect at different temperature or after a long period use.

The present invention provides a damping device of a window covering, wherein the window covering includes a headrail, a covering material, and a driving device. The driving device is located in the headrail to raise and extend the covering material. The damping device is provided in the headrail, and is connected to the driving device. The damping device includes a metal member and a magnetic member, wherein the magnetic member has a first magnetic pole and a second magnetic pole, wherein either one or both the first magnetic pole and the second magnetic pole faces the metal member. The metal member is located within a magnetic field of the magnetic member; either one or both the metal member and the magnetic member is drivable by the driving device to make the metal member and the magnetic member move relative to each other.

Wherein the metal member includes a metal roller and the magnetic member is provided in the metal roller; either one or both the first magnetic pole and the second magnetic pole faces an inner surface of the metal roller.

Wherein the first magnetic pole and the second magnetic pole are aligned to a straight line which is parallel to a radial direction of the metal roller.

Wherein the damping device of the window covering further includes an adjusting unit which is adapted to adjust an overlapping area between the magnetic member and the inner surface of the metal roller.

Wherein the metal roller has an open end; the adjusting unit includes a holder, a threaded sleeve, a threaded rod, and a fixing seat, wherein the threaded sleeve is located on the holder; the threaded rod is movably connected to the threaded sleeve. The fixing seat is connected to the threaded rod and is inserted into the metal roller through the open end of the metal roller; the magnetic member is provided in the fixing seat.

Wherein the metal member includes a bushing provided in the metal roller; the adjusting unit includes a protruding shaft passing through the bushing, wherein the metal roller is rotatable relative to the fixing seat around the protruding shaft.

Wherein the metal member includes a metal rotary disc, which has two opposite surfaces. The magnetic member includes at least a first magnet, wherein the first magnet has the first magnetic pole and the second magnetic pole. Either the first magnetic pole or the second magnetic pole of the first magnet faces one of the two opposite surfaces of the metal rotary disc.

Wherein the metal member includes a metal rotary disc, which has two opposite surfaces. The magnetic member includes at least a first magnet and a least a second magnet, wherein the first magnet has two magnetic poles, and one of the magnetic poles is defined as the first magnetic pole. The second magnet has two magnetic poles, and one of the magnetic poles is defined as the second magnetic pole. The first magnet and the second magnet respectively correspond to different one of the two opposite surfaces of the metal rotary disc. The first magnetic pole and the second magnetic pole face the metal disc with different polarity.

Wherein the damping device further includes at least a fixing seat provided on a side of the metal rotary disc; the first magnet is provided in the fixing seat.

Wherein the damping device further includes an adjusting unit which is adapted to adjust a relative position between the magnetic pole of the first magnetic and the metal rotary disc.

Wherein the damping device further includes one-way clutch provided between the metal member and the driving device, wherein the one-way clutch is drivable by the driving device to rotate the metal member in a unidirectional way.

Wherein the damping device further includes a one-way clutch provided between the magnetic member and the driving device, wherein the one-way clutch is drivable by the driving device to rotate the magnetic member in a unidirectional way.

Wherein the damping device further includes a gearbox provided between the metal member and the driving device, wherein the gearbox includes an input shaft and an output shaft; the input shaft is connected to the driving device, and the output shaft is connected to the metal member for synchronous rotation with the metal member and the gearbox.

Wherein the damping device further includes a gearbox provided between the magnetic member and the driving device, wherein the gearbox includes an input shaft and an output shaft; the input shaft is connected to the driving device, and the output shaft is connected to the magnetic member for synchronous rotation with the magnetic member and the gearbox.

Whereby, with the interaction between the magnetic member and the metal member, the damping device provides a desired damping effect at different temperature or after a long period use, such that the rotation of the metal member is slow down, which slows down the movement of the covering material.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
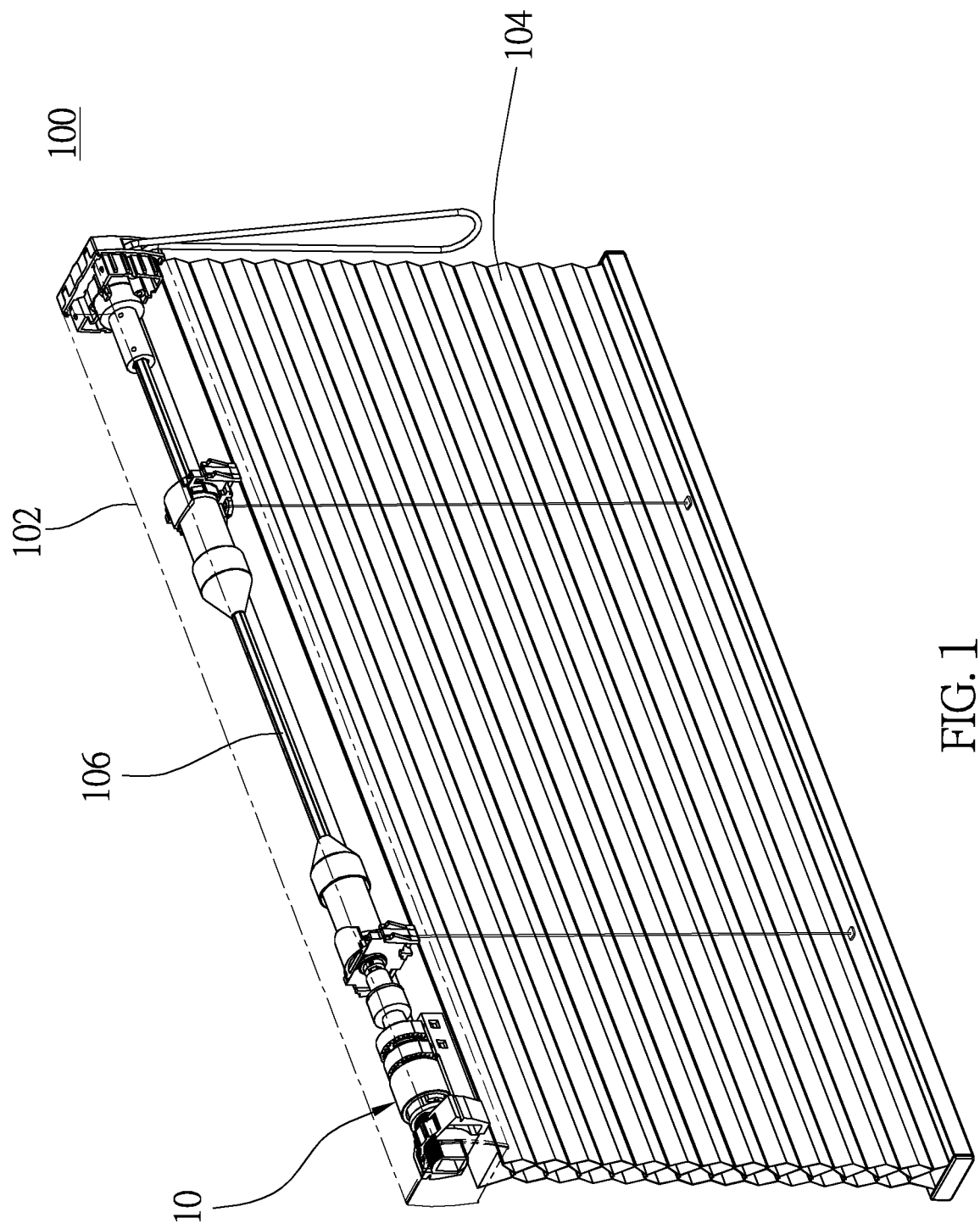
FIG. 1 is a perspective view of a first preferred embodiment of the present invention, showing the damping device installed in the headrail of a window covering.

As shown in FIG. 1, a window covering 100 provided with a damping device 10 includes a headrail 102, a covering material 104, and a driving device which is a rotary shaft 106 in the first preferred embodiment, wherein the rotary shaft 106 is located in the headrail 102 to raise and extend the covering material 104. The damping device 10 is provided in the headrail 102, and is connected to the rotary shaft 106. As illustrated in FIG. 2 to FIG. 6, the damping device 10 includes a metal member 12, a magnetic member which is a magnet 30 in the first preferred embodiment, and an adjusting unit 16, a one-way clutch 32, and a gearbox 38.

Figure 2:
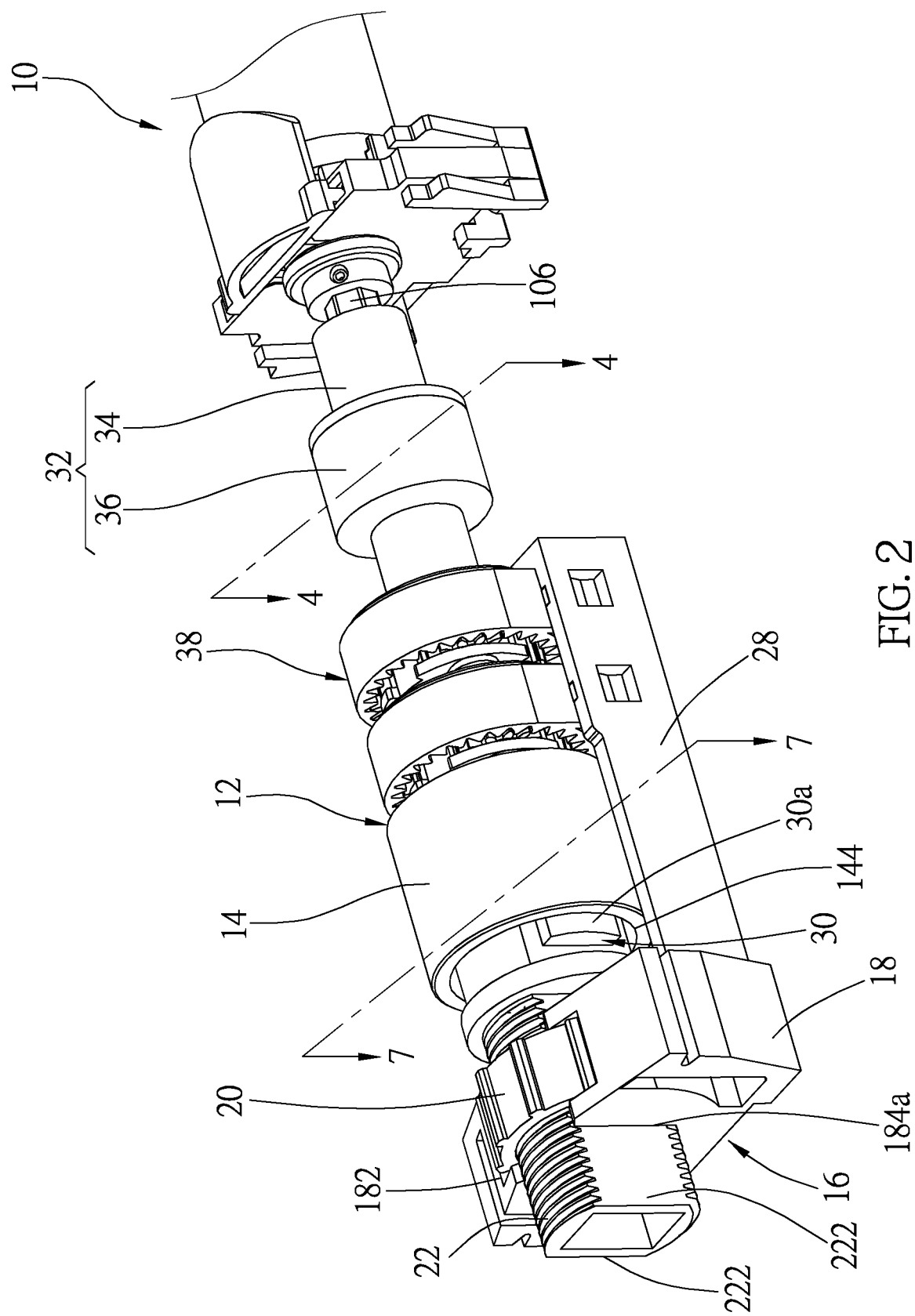
FIG. 2 is a perspective view of the first preferred embodiment, showing the damping device.
Figure 3:
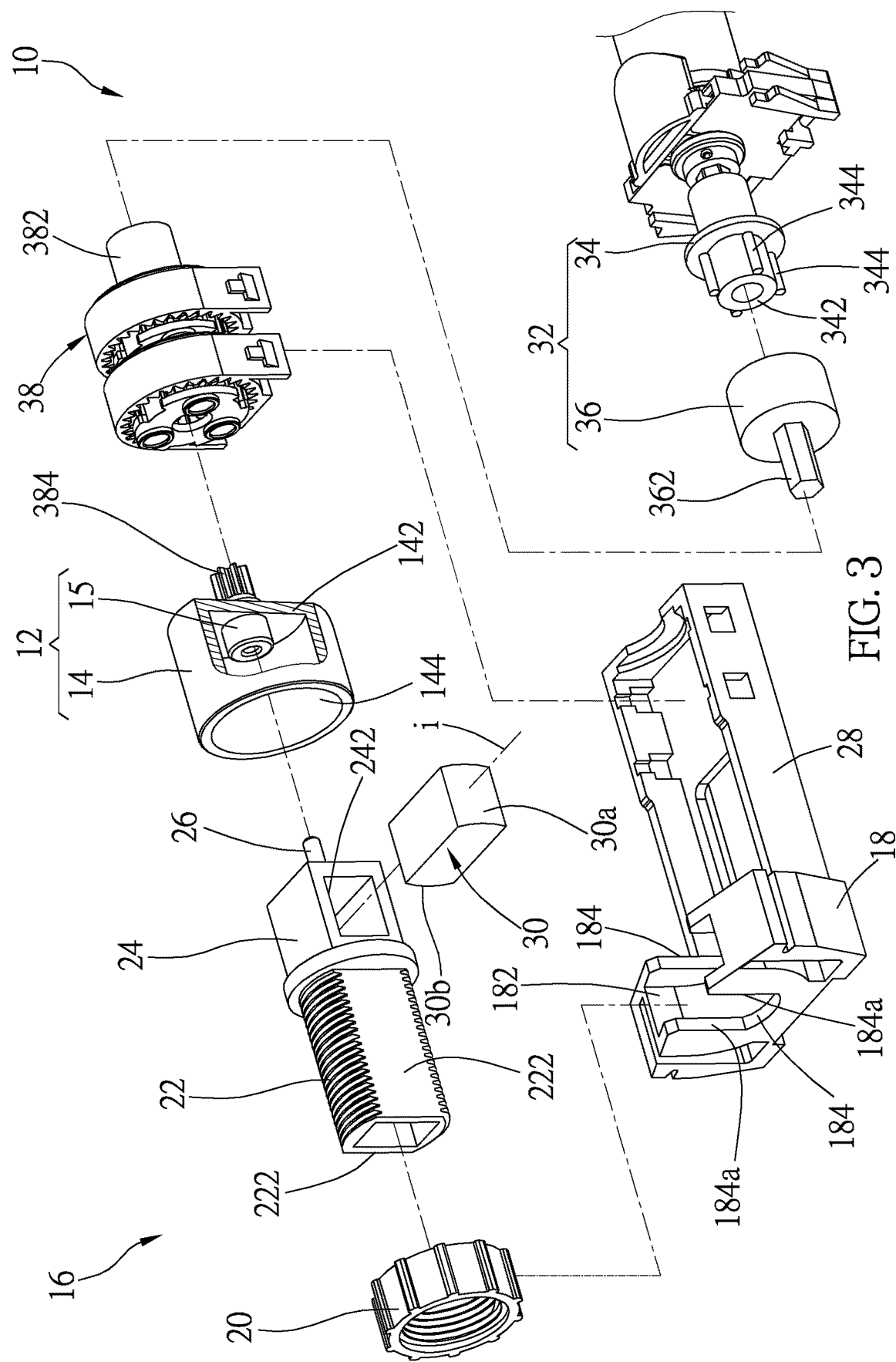
FIG. 3 is a exploded view of the damping device in FIG. 2.
Figure 4:
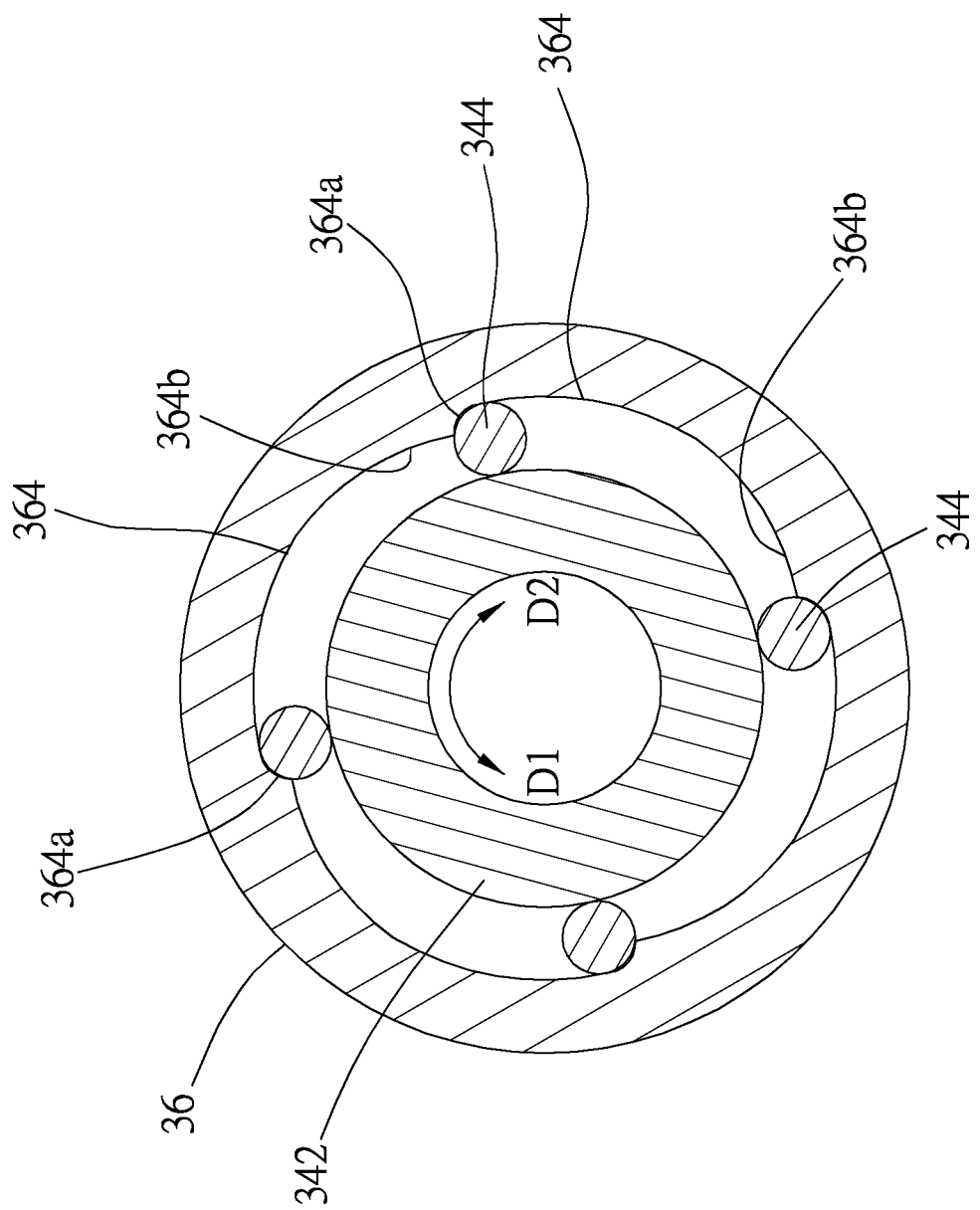
FIG. 4 is a sectional view along the 4-4 line in FIG. 2.

As depicted in FIG. 2 to FIG. 4, the metal member 12 of the damping device 10 includes a metal roller 14 and a bushing 15. The metal roller 14 in the first preferred embodiment is made of nonmagnetic metal, such as aluminum and copper, and has a closed end 142 and an open end 144 opposite to each other. The bushing 15 is provided in the metal roller 14, and is extended from an inner surface of the closed end 142.

The adjusting unit 16 of the damping device 10 includes a holder 18, a threaded sleeve 20, a threaded rod 22, and a fixing seat 24, wherein the holder 18 is connected to a base 28 which is installed inside the headrail 102. The holder 18 has a receiving groove 182 to receive the threaded sleeve 20. The holder 18 further has two slots 184 communicating with the receiving groove 182, and each of the slots 184 has two slot walls 184a face to each other. The threaded rod 22 passes the two slots 184, and is movably screwed the threaded sleeve 20. The threaded rod 22 has two opposite flat surfaces 222 which abut against the slot walls 184a of the slots 184. The fixing seat 24 is connected to an end of the threaded rod 22, and is inserted into the metal roller 14 from the open end 144. The fixing seat 24 has a hole 242 penetrating the fixing seat 24, and the penetrating direction is aligned in the radial direction of the metal roller 14. A protruding shaft 26 is formed on the fixing seat 24, and is inserted into the bushing 15, such that the metal roller 14 is rotatable relative to the fixing seat 24 around the protruding shaft 26.

The magnet 30 is a permanent magnet in the first preferred embodiment, wherein the magnet 30 has a first magnetic pole 30a and a second magnetic pole 30b, which are located on two opposite ends thereof, and are aligned in the same axis i. The magnet 30 is located inside the hole 242 of the fixing seat 24 as well as the metal roller 14, wherein both the first magnetic pole 30a and the second magnetic pole 30b face the inner surface of the metal roller 14. The axis i is provided at the radial direction of the metal roller 14. A space is formed between each of the magnetic poles 30a, 30b and the inner surface of the metal roller 14, wherein the metal roller 14 is located in the magnetic field of the magnet 30. However, in another embodiment, the first and second magnetic poles 30a, 30b could abut against the inner surface of the metal roller 14 provided that the metal roller 14 is rotatable relative to the magnet 30.

Figure 5:
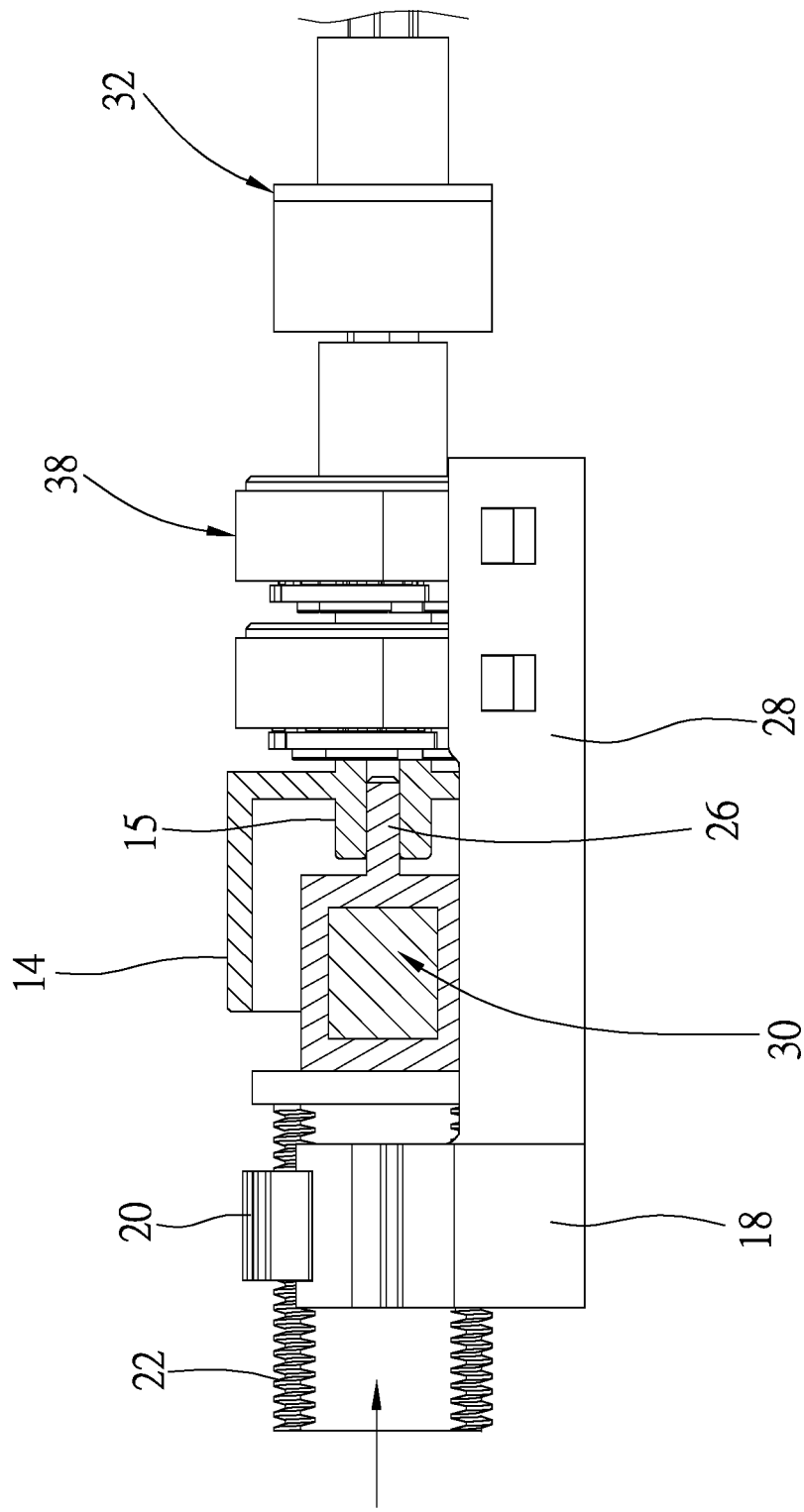
FIG. 5 is a partial sectional view of the first preferred embodiment.
Figure 6:
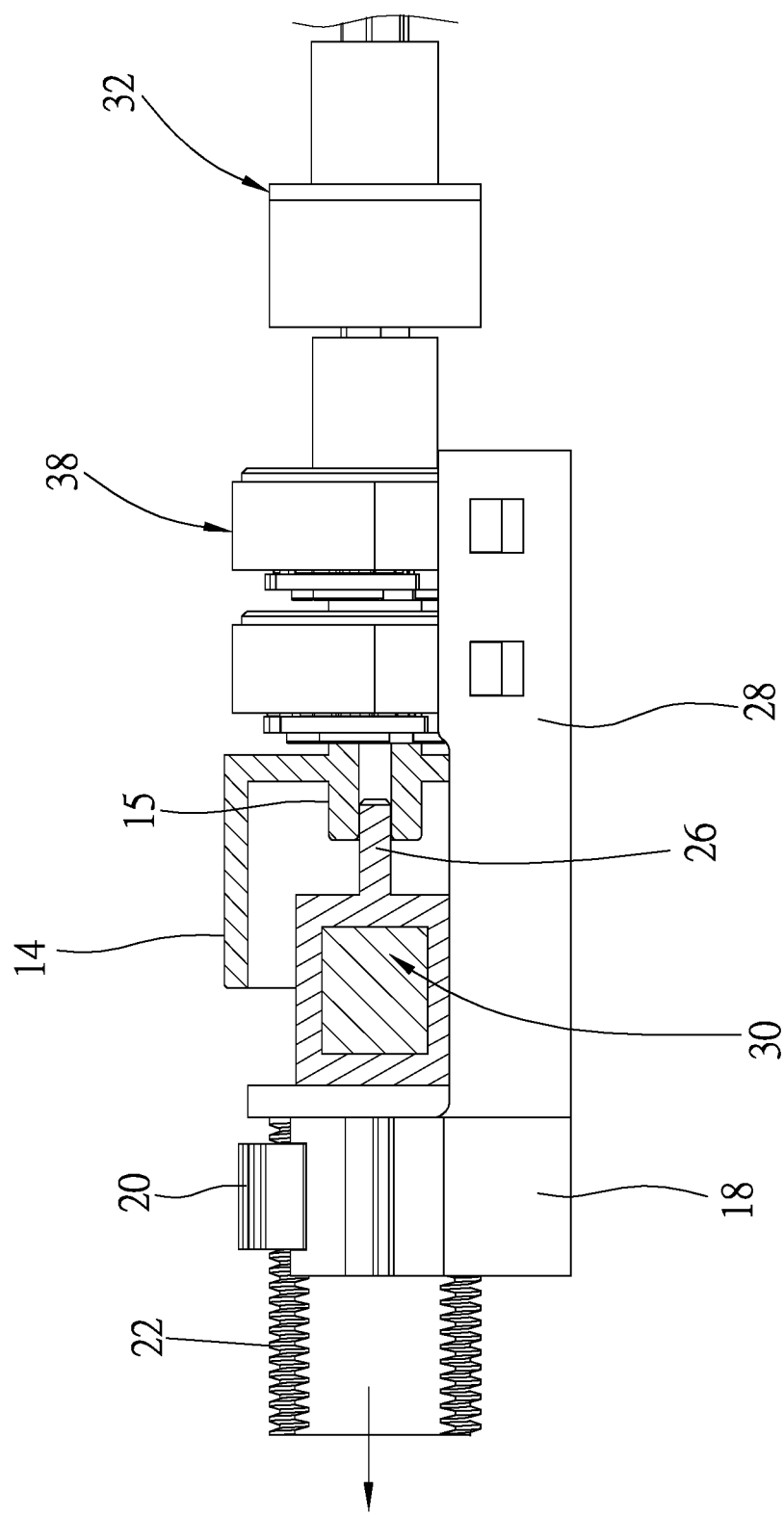
FIG. 6 is a partial sectional view of the first preferred embodiment, showing the magnet is moved outside the metal roller.

As shown in FIG. 5 and FIG. 6, clockwise or counter-clockwise rotation of the threaded sleeve 20 could drive the movement of the threaded rod 22, and thus adjust the relative position of the magnet 30 and the metal roller 14, which change the overlapping area between the magnetic poles 30a, 30b and the inner surface of the metal roller 14.

As shown in FIG. 2 to FIG. 4, the one-way clutch 32 includes a main body 34 and a sleeve 36, wherein the main body 34 is connected to an end of the rotary shaft 106. The main body 34 includes a cylindrical portion 342, and a plurality of rollers 344 are provided on the outer surface of the cylindrical portion 342, wherein the rotation axes of the rollers 344 are parallel to the rotary shaft 106. The sleeve 36 is fitted around the cylindrical portion 342, and a polygonal shaft rod 362 is connected to an end of the sleeve 36. The inner surface of the sleeve 36 has a plurality of notches 364, and each of the rollers 344 is located in one of the notches 364. Each of the notches 364 has a stop portion 364a and a cambered surface 364b, wherein the space between the stop portion 364a and the cylindrical portion 342 is greater than the space between the cambered surface 364b and the cylindrical portion 342. When the rotary shaft 106 drives the main body 34 to rotate in a first direction D1, the rollers 344 abut against the stop portion 364a and revolve by themselves, such that the cylindrical portion 342 can not drive the sleeve 36 to rotate. When the rotary shaft 106 drives the main body 34 to rotate in a second direction D2 which is opposite to the first direction D1, the rollers 344 are rolling on the cambered surface 364b of the notches 364, and finally abut against the cylindrical portion 342 to generate a greater friction with no revolving, such that the cylindrical portion 342 can drive the sleeve 36 to rotate. In this sense, the sleeve 36 is rotatable in one direction; the above-mentioned second direction D2 is the rotational direction of the rotary shaft 106, which extends the covering material 104.

In the first preferred embodiment, the gearbox 38 includes a planet gear, an input shaft 382, and an output shaft 384, and is installed in the headrail 102 through the base 28. The input shaft 382 is connected to the shaft rod 362 of the one-way clutch 32; the output shaft 384 is the sun shaft of the planet gear, and is connected to an outer surface of the closed end 142. Whereby, the damping device 10, the one-way clutch 32, and the gearbox 38 are connected in series, such that the rotary shaft 106 can drive the metal member 12 to rotate in one direction.

Figure 7:
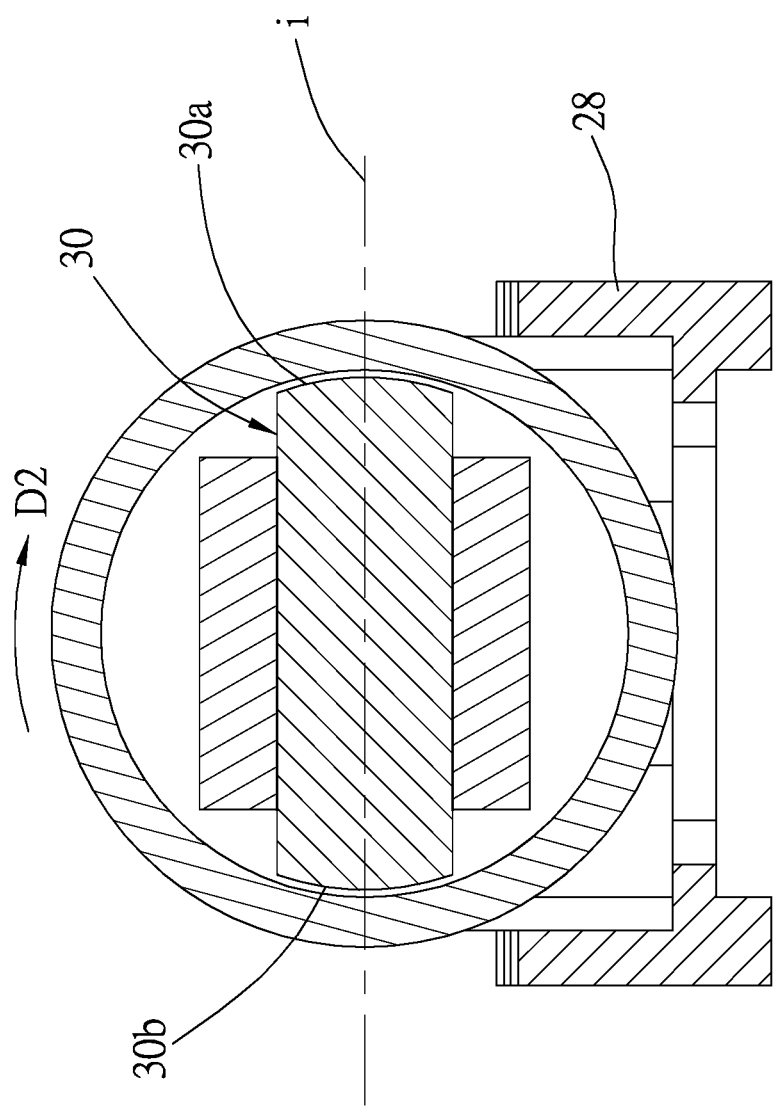
FIG. 7 is a sectional view along the 7-7 line in FIG. 2.

As shown in FIG. 7, during the rotation of the metal roller 14, the portion of the metal roller 14 which extends to the first magnetic pole 30a would generate an eddy current and thus an inductive magnetic field. The inductive magnetic field interacts with the magnetic force of the first magnetic pole 30a to generate a resistance to slow down the rotation of the metal roller 14. Similarly, the portion of the metal roller 14 which extends to the second magnetic pole 30b would also generate an inductive magnetic field, which further slows down the rotation of the metal roller 14. Whereby, the magnet 30 and the metal roller 14 provide a damping effect during the raising of the covering material 104.

In additional, the first magnetic pole 30a and the second magnetic pole 30b are aligned in the axis i, so that the resistance can be evenly provided at two opposite positions on the inner surface of the metal roller 14. Therefore, the rotation shaft of the metal roller 14 would not incline. Practically, either one or both of the first and the second magnetic poles 30a, 30b faces the inner surface, the outer surface, or the closed end 142 of the metal roller 14, the damping device 10 can provide a damping effect. In the first preferred embodiment, the metal roller 14 is rotatable relative to the magnet 30, and vice versa; in more details, with different mechanical arrangements, the magnet 30 could be drivable to rotate in one direction by the one-way clutch; and in another embodiment, the magnet 30 is connected to the output shaft 384 of the gearbox 38 to be drivable to rotate.

Figure 8:
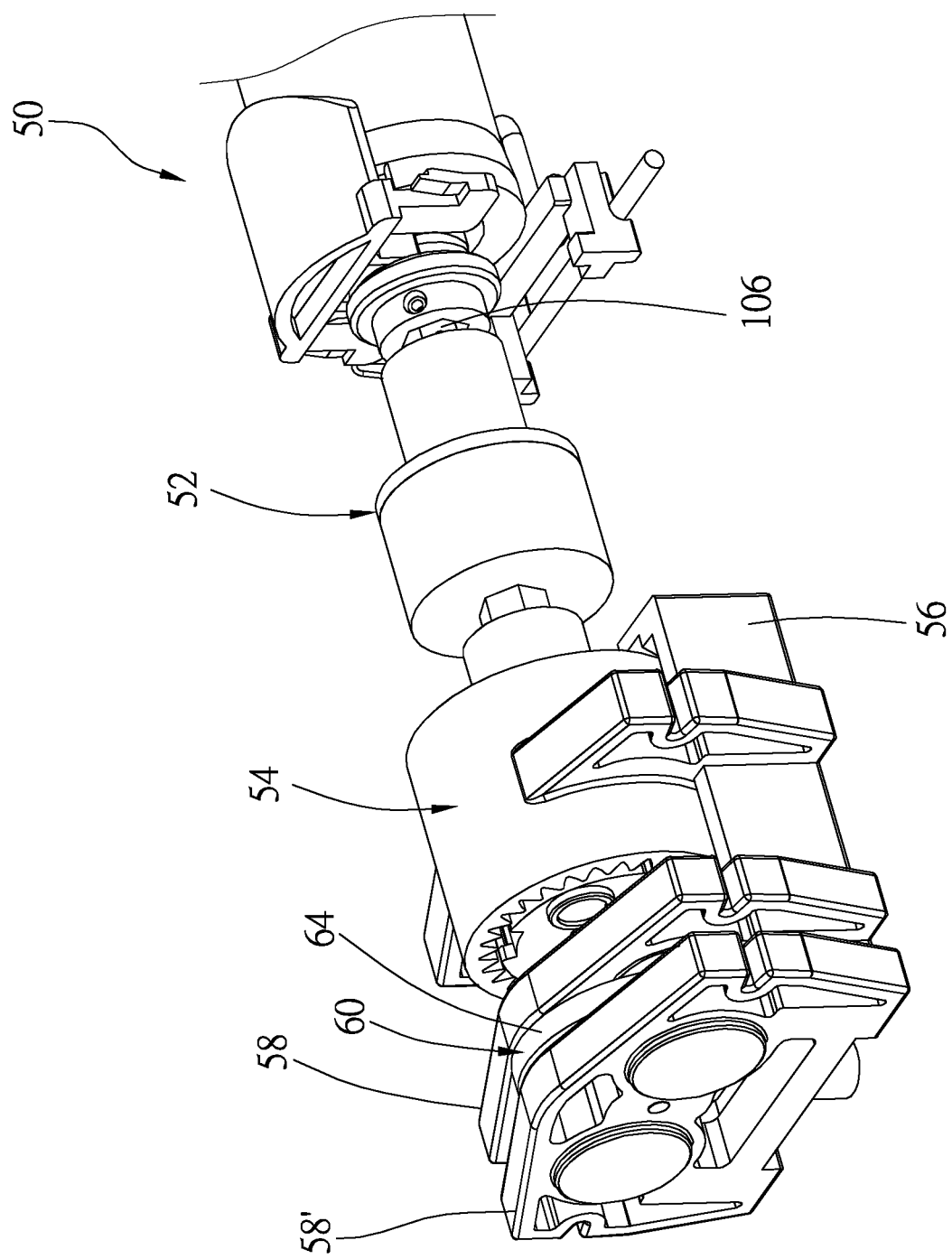
FIG. 8 is a perspective view of a second preferred embodiment, showing the damping device.
Figure 9:
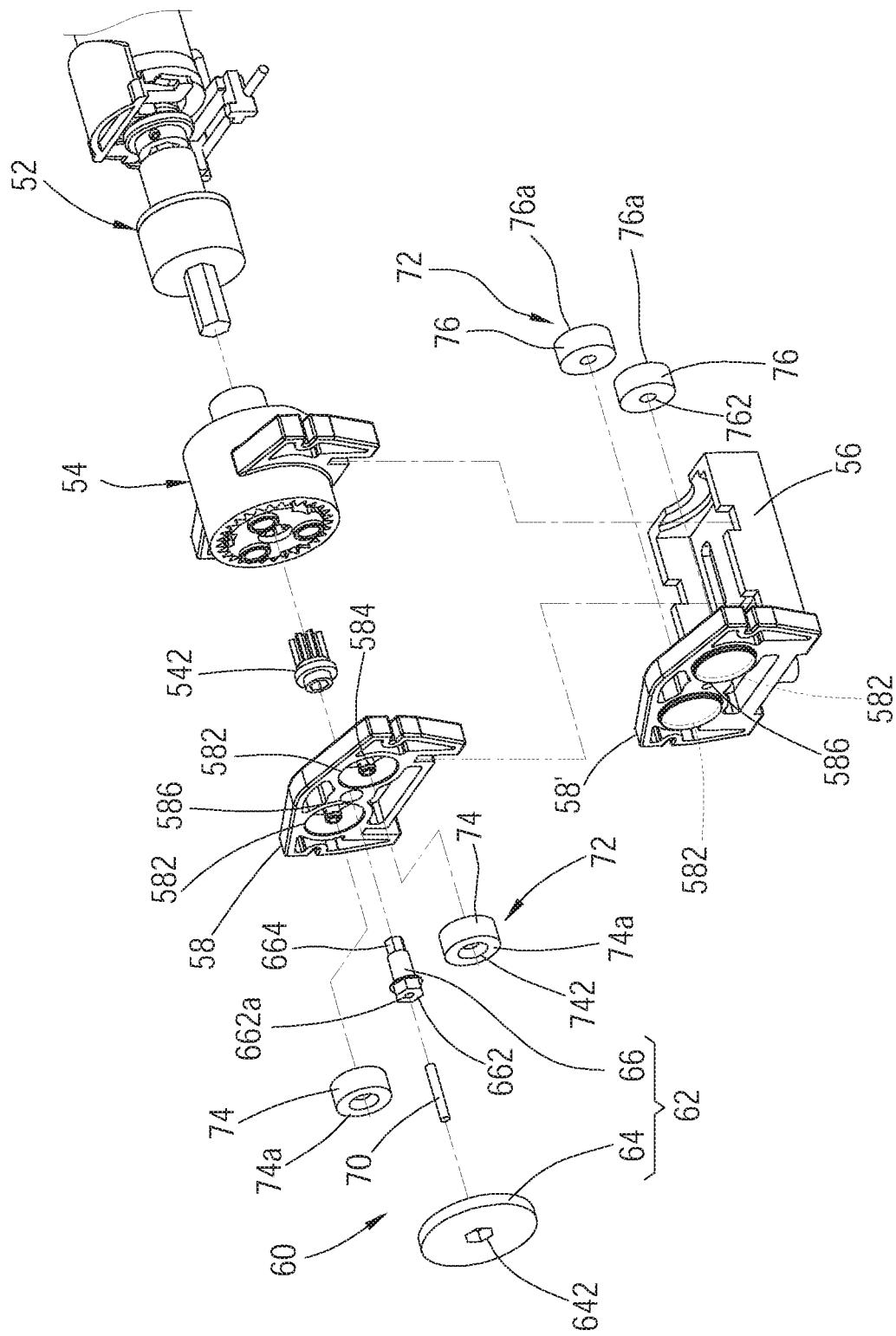
FIG. 9 is a exploded view of the damping device in FIG. 8.
Figure 10:
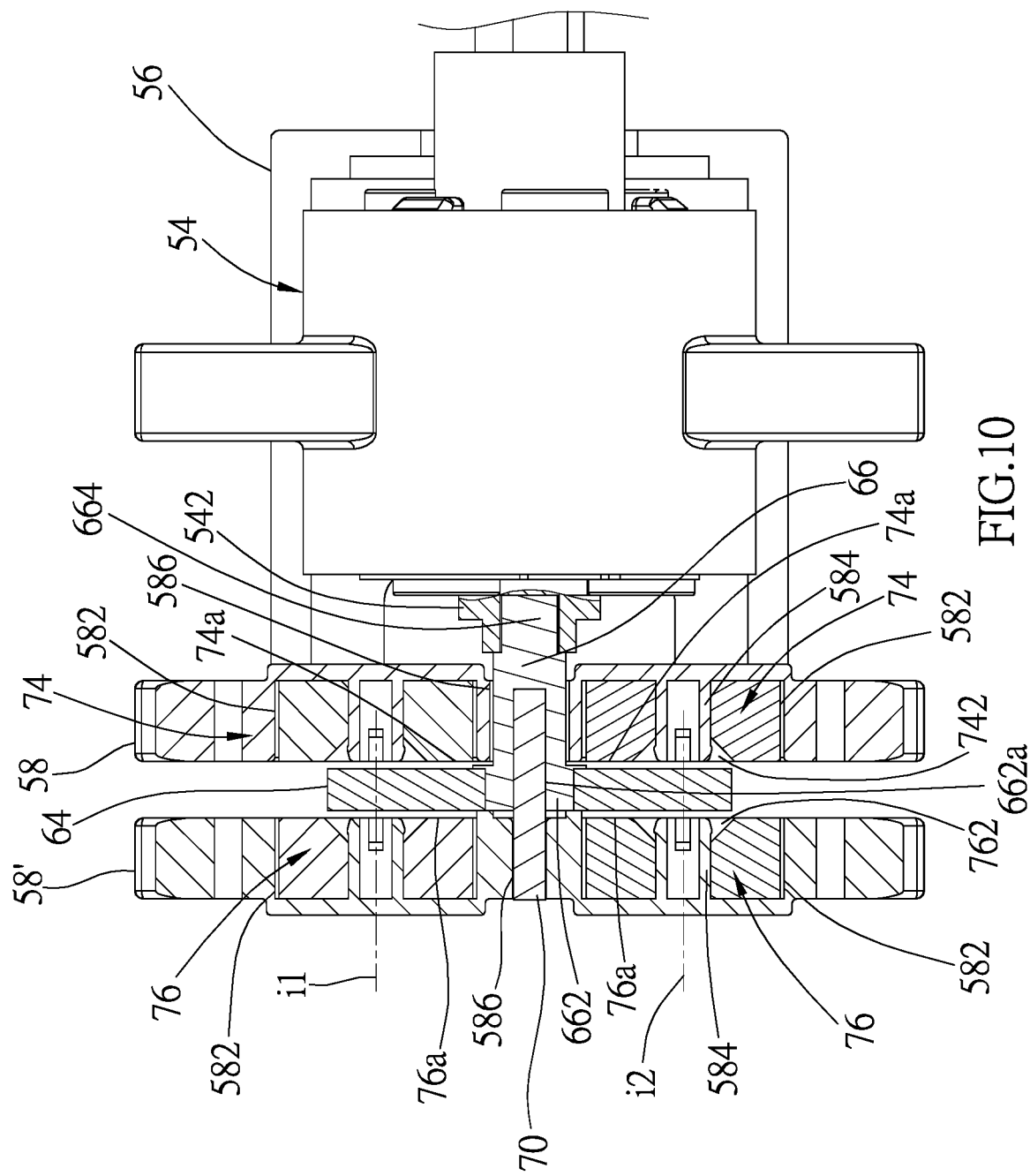
FIG. 10 is a partial sectional view of the second preferred embodiment.

The damping device 50 in FIG. 8 to FIG. 10 is similar to the first preferred embodiment, including a one-way clutch 52, a gearbox 54, a metal member 60, and a magnetic member 72. The one-way clutch 52 is provided between the gearbox 54 and the rotary shaft 106, wherein the gearbox 54 is installed in the headrail 102 through a base 56.

Two fixing seats 58, 58' facing to each other are located on the base 56, and neighbor the gearbox 54. Each of the fixing seats 58, 58' has two recesses 582 and two connecting poles 584, and each of the connecting poles 584 is located the recesses 582 respectively. Each of the fixing seats 58, 58' has a shaft hole 586 between the two recesses 582; the distance between the shaft hole 586 and one of the recesses 582 is equal to the other recess 582. Each of the recesses 582 of the fixing seat 58 corresponds to one of the recesses 582 of the fixing seat 58', and the two corresponding recesses 582 are aligned with two axes i1 and i2 respectively.

The metal member 60 includes a metal rotary disc 62 and a shaft rod 70, wherein the metal rotary disc 62 includes a disc 64 and a shaft 66. The disc 64 has two opposite surfaces, and is provided between the two fixing seats 58, 58', such that the two fixing seats 58, 58' respectively face one of the two opposite surfaces of the disc 64. A polygonal hole 642 is formed at the center of the disc 64, and an end 662 of the shaft 66 corresponds to the polygonal hole 642, such that the shaft 66 passes through the fixing seat 58; another end 664 of the shaft 66 is connected to the output shaft 542 of the gearbox 54. The shaft rod 70 passes through the fixing seat 58', and is inserted into a hole 662a at the end 662 of the shaft 66. Whereby, when the rotary shaft 106 rotates in a specific direction, the metal rotary disc 62 would be rotated.

The magnetic member 72 includes two first magnets 74 and two second magnets 76; the two first magnets 74 are located in the recesses 582 of the fixing seat 58 respectively, wherein each of the first magnets 74 has a connecting hole 742 for the corresponding connecting pole 584 to pass through. Each of the first magnets 74 has a first magnetic pole 74a which faces one of the surface of the disc 64, such that the distance between one of the first magnets 74 and the shaft 66 is equal to the distance between the other of the first magnets 74 and the shaft 66. On the other hand, the two second magnets 76 are located in the recesses 582 of the fixing seat 58' respectively, wherein each of the second magnets 76 has a connecting hole 762 for the corresponding connecting pole 584 to pass through. Each of the second magnets 76 has a second magnetic pole 76a which faces another surface of the disc 64, wherein the second magnetic pole 76a is opposite to the first magnetic pole 74a. The second magnetic poles 76a and the first magnetic poles 74a are aligned at the axis i1 and axis i2 respectively.

With the above structures, when the rotary shaft 106 drives the disc 64 to rotate, a portion of the disc 64 which extends to the first magnetic pole 74a of the first magnet 74 would generate an eddy current and thus an inductive magnetic field. The inductive magnetic field interacts with the magnetic force of the first magnetic pole 74a to provide a resistance for slowing down the rotation of the disc 64. Similarly, a portion of the disc 64 which extends to the second magnetic pole 76a of the second magnet 76 would also generate an inductive magnetic field to interact with the magnetic force of the second magnetic pole 76a for further slowing down the rotation of the disc 64. Whereby, the structures above provide a damping effect during the extending of the covering material 104.

Additionally, the distance between the shaft 66 and all the first magnets 74 and the second magnets 76 are equal. Therefore, the resistance can be evenly provided at two opposite surfaces of the disc 64, which prevents the rotation shaft of the disc 64 from being inclined. Practically, the number of the first magnet 74 and the second magnet 76 is not limited. The damping effect can be provided as long as the magnetic pole of at least one first magnet 74 or at least one second magnet 76 faces one surface of the disc 64; in this case, the number of the fixing seat 58, 58' and the recesses 582 thereof could be reduced to one. Moreover, the damping device 50 can further have an adjusting unit to adjust the positional relation between the magnetic poles and the disc 64, such as the distance between the magnetic pole and the disc 64, or the overlapping area between the magnetic pole and the disc 64.

In conclusion, with the interaction between the magnetic pole of the magnetic member and the metal member, the damping device can keep providing a desired damping effect to slow down the rotation of the metal member. In addition, the material of the metal member could be magnetic in another embodiment, and thus the damping effect can be generated by the magnetic force between the magnetic member and the metal member. Furthermore, the damping device in another embodiment does not include the one-way clutch, which generates the damping effect when the covering material raises as well as it extends, to slow down both the raising and extending of the covering material. Additionally, the structure of the one-way clutch is not limited, in more details, the conventional one-way clutch with a spring or a ratchet wheel can be applied. For a lighter covering material, the damping device thereof does not need the gearbox.

It must be pointed out that the embodiments described above are only some preferred embodiments of the present invention. All equivalent structures which employ the concepts disclosed in this specification and the appended claims should fall within the scope of the present invention.

What is claimed is:

1. A damping device for a window covering, wherein the window covering includes a headrail, a covering material, and a driving device, wherein the driving device is located in the headrail to raise and extend the covering material; when assembled with the window covering, the damping device is in the headrail, and is connected to the driving device; the damping device comprising:

a metal member;

a magnetic member having a first magnetic pole and a second magnetic pole, wherein the first magnetic pole and the second magnetic pole are opposite magnetic poles; either one or both of the first magnetic pole and the second magnetic pole faces the metal member; and at least three gears are provided between the magnetic member and the driving device;

wherein the metal member is located within a magnetic field of the magnetic member; the metal member is drivable by the driving device to make the metal member and the magnetic member move relative to each other;

wherein the metal member comprises a metal rotary disc, which has two opposite surfaces; the magnetic member comprises at least a first magnet, wherein each of the at least one first magnet has the first magnetic pole facing the same one of the two opposite surfaces of the metal rotary disc;

wherein the opposite surfaces of the metal rotary disc have substantially equal surface areas;

wherein the metal rotary disc is made of nonmagnetic metal;

wherein an input shaft connects the driving device and the at least three gears, and an output shaft connects the magnetic member and the at least three gears to synchronously rotate the magnetic member and the at least three gears.

2. The damping device of claim 1, wherein the magnetic member further comprises at least one second magnet, wherein the at least one second magnet has the second magnetic pole, the second magnet faces the other one of the two opposite surfaces of the metal rotary disc with the second magnetic pole.

3. The damping device of claim 2, further comprising at least a fixing seat provided on a side of the metal rotary disc; the first magnet and the second magnet are provided in the fixing seat.

4. The damping device of claim 3, further comprising an adjusting unit which is adapted to adjust a relative position between the metal rotary disc and the first magnetic pole of the first magnet which faces one of the two opposite surfaces of the metal rotary disc.

5. The damping device of claim 1, further comprising at least a fixing seat provided on a side of the metal rotary disc; the first magnet is provided in the fixing seat.

6. The damping device of claim 5, further comprising an adjusting unit which is adapted to adjust a relative position between the metal rotary disc and the first magnetic pole of the first magnet which faces one of the two opposite surfaces of the metal rotary disc.

7. The damping device of claim 1, further comprising a one-way clutch provided between the metal member and the driving device, wherein the one-way clutch is drivable by the driving device to rotate the metal member in a unidirectional way.

* * * * *